United States Patent [19]

Hansen

[11] Patent Number: 4,508,184

[45] Date of Patent: Apr. 2, 1985

[54] ROLLER REAMER/STABILIZER

[76] Inventor: Michael S. Hansen, 4694 Lemonwood Circle, West Valley City, Utah 84120

[21] Appl. No.: 498,868

[22] Filed: May 27, 1983

[51] Int. Cl.³ .................... E21B 10/20; E21B 10/30
[52] U.S. Cl. .................... 175/346; 175/347; 29/434; 29/526 R; 403/356; 403/318; 76/108 A
[58] Field of Search ............. 175/346, 347, 345, 344, 175/325, 348, 406, 408; 29/434, 469, 526 R; 76/108 A, 108 R, 101 E, 101 R; 403/356, 318, 319, 358, 19, 7; 308/4 A

[56] References Cited

U.S. PATENT DOCUMENTS

| Re. 27,781 | 10/1973 | Garrett | 175/345 |
|---|---|---|---|
| B 300,353 | 1/1975 | Goodfellow | 175/374 |
| 1,940,415 | 12/1933 | Harrington et al. | 175/346 |
| 2,096,447 | 10/1937 | Catland | 76/108 A |
| 2,128,416 | 8/1938 | Howard et al. | 175/347 |
| 2,199,693 | 5/1940 | Catland | 175/346 |
| 2,592,277 | 4/1952 | Hammer | 175/371 |
| 2,698,738 | 1/1955 | Turner | 175/346 |
| 2,901,787 | 9/1959 | Whistler, Sr. et al. | 403/19 |
| 3,054,466 | 9/1962 | Wagnon et al. | 175/347 |
| 3,158,214 | 11/1964 | Wisler et al. | 175/375 |
| 3,907,048 | 9/1975 | Gray | 175/325 |

FOREIGN PATENT DOCUMENTS

| 2081346 | 2/1982 | United Kingdom | 175/325 |
|---|---|---|---|
| 0595481 | 2/1978 | U.S.S.R. | 175/345 |

Primary Examiner—James A. Leppink
Assistant Examiner—Hoang C. Dang
Attorney, Agent, or Firm—Workman, Nydegger & Jensen

[57] ABSTRACT

A roller reamer/stabilizer apparatus for use on a drill string assembly. The apparatus includes a reamer body which has a number of pockets formed in the body. A cutter assembly is anchored in each pocket. The cutter assembly includes a bearing pin on which two bearing blocks are mounted with a reamer cutter mounted in between the two bearing blocks. The entire cutter assembly is first assembled and is then placed in a corresponding pocket of the reamer body. The cutter assembly is secured within the pocket by means of pull pins which are inserted transversely through the reamer body so as to engage corresponding holes which are formed in the bearing blocks of the cutter assembly. The pull pins are secured by means of snap rings that can be easily removed so that the pull pins can then be retracted to permit the cutter assembly to be replaced after it is worn.

19 Claims, 4 Drawing Figures

ROLLER REAMER/STABILIZER

BACKGROUND

1. Field of the Invention

The present invention relates to roller reamers and stabilizers used in the earth drilling industry and, more particularly, to a novel system and method for mounting reamer cutters onto the body of the reamer.

2. The Prior Art

When drilling deep bore holes for oil wells or the like, it is usually necessary to include one or more reamers in the drill string to maintain the proper gauge of the hole and to remove any ledges or obstructions that may block the hole. Such reamers may also be used as stabilizers to prevent changes from occurring in the angle at which the bore hole is drilled. For example, roller reamers which are positioned in the drill string immediately above the drill bit are generally referred to as "bit reamers" or "bottom hole reamers," which are used to maintain the proper gauge of the hole near the bit to minimize the back-to-bottom reaming which would otherwise be necessary when a worn out bit is replaced by a new bit. Roller reamers are placed in the drill string at various points further up the string to provide stabilization by reaming out "dog legs," "key seats," and ledges which may be formed in the bore hole. Stabilization is especially important when drilling directional wells.

In the past, some types of prior art roller reamers have used reamer cutters which are welded into place on the body of the reamer. Since reamer/stabilizers are frequently designed for use in hard rock formations, the reamer cutters eventually become worn and have to be either repaired or replaced. In those types of prior art reamer/stabilizers in which the reamer cutters are welded into place, replacement of the cutters presents a serious problem. Often, the entire reamer must be discarded after the cutter becomes worn. In the alternative, the weld which secures the reamer cutter must be torch-cut so that the assembly can be removed and replaced with a new cutter. This can be a very time consuming and difficult process that requires additional welding equipment along with the services of a skilled welder. This obviously increases the expense and inconvenience involved and is thus not a very desirable alternative.

These problems have led to the development of another type of prior art reamer/stabilizer which has been designed to permit the drilling crew to be able to replace the reamer cutter without having to cut through a weld. This type of prior art reamer is generally illustrated in FIG. 1. As shown in FIG. 1, the reamer/stabilizer has a body 12 which is formed from a length of pipe. The body 12 has a threaded female fitting 14 and a threaded male fitting 16 at opposite ends thereof so that the reamer body can be attached to the other lengths of pipe which form the drill string. In the illustration of FIG. 1, the reamer/stabilizer is provided with three reamer cutters, two of which are shown at 18a, which are equally spaced about the lower portion of the reamer. Three more cutters, two of which are shown at 18b, are equally spaced about the upper portion of the reamer/stabilizer. Each reamer cutter 18 is identical in configuration and in the manner in which they are secured to the body 12 of the reamer/stabilizer.

As best illustrated by the portion of FIG. 1 which is shown in exploded perspective, each reamer cutter 18 has a bore 20 through its center which is designed to receive a bearing pin 22. Bearing blocks 24-25 are placed at the ends of the reamer cutter 18 and each bearing block 24-25 has a corresponding bore 26-27 through which the bearing pin 22 is inserted.

In order to install the reamer cutters 18 on the reamer body 12, the lower bearing block 24 is first placed in the pocket 32 that is cut into the face of the reamer body 12. The bearing block 24 is then pounded with a large sledge hammer so that the slots 28-29 will engage corresponding mill flats 36 which are formed in the lower end 34 of the pocket 32. The upper bearing block 25 is then placed in the pocket 32 and is also pounded with a large sledge hammer until the slots 30-31 of bearing block 25 engage the corresponding mill flats 37 in the upper end 35 of pocket 32. The reamer cutter 18 is then positioned in the pocket 32 between the bearing blocks 24 and 25. Next, the bearing pin 22 is placed in the elongated dressing slot 38 and is then pounded with a sledge hammer until the leading end 21 of bearing pin 22 is fully inserted through the bore 26 of the lower bearing block 24. When the bearing pin 22 is fully inserted through the upper bearing block 25, cutter 18 and lower bearing block 24, the leading end 21 may be grasped and rotated until the small hole 42 at the trailing end of pin 22 is positioned adjacent slot 39. A retaining pin 40 is then inserted through slot 39 and hole 33 using a punch and hammer until it engages the hole 42 at the end of the bearing pin 22. Pin 40 prevents the bearing pin 22 from rotating. Finally, a second retaining pin 44 is inserted behind the upper end of the bearing pin 22 in the dressing slot 38 to prevent the bearing pin 22 from moving longitudinally once it has been properly inserted.

In order to remove and replace the reamer cutter 18, a reverse procedure is followed. That is to say, retaining pin 44 is first removed, pin 40 is then removed using a punch and hammer and then bearing pin 22 is removed by inserting a punch into the lower end 46 of the dressing slot 38 and by pounding the end of the bearing pin 22 until it is removed from the bearing blocks 24-25 and the reamer cutter 18. The reamer cutter 18 is then removed from between the bearing blocks 24 and 25, and then bearing block 25 is pounded with a large sledge hammer so as to disengage the bearing block 25 from the mill flats 37 which retain it. Bearing block 24 is removed in a similar manner.

This type of prior art reamer/stabilizer has a certain advantage in that the bearing blocks and reamer cutter can be more easily replaced than in those types of reamer/stabilizers in which the bearing blocks are welded. However, there are also serious disadvantages with this type of prior art reamer/stabilizer. For example, it is very difficult, particularly in very cold climates, to insert or remove the bearing blocks 24 and 25. A great deal of force is required and frequently the hard hammer blows result in damage to the mill flats 36-37 or corresponding slots 28-31 of the bearing blocks. Since the mill flats 36-37 are used to retain the bearing blocks 24 and 25 in the pocket, damage to the mill flats may result in a situation in which the tremendous centrifugal force exerted by the rapidly rotating drill string will cause the bearing blocks to tear loose from the pocket, resulting in serious damage to equipment and costly down time. Damage can also occur if the retaining pin 44 is lost or broken when drilling.

Another disadvantage with this type of prior art reamer/stabilizer is that the extremely hard hammer blows which are required to insert or remove the bearing pin 22 may shatter the pin because it is typically constructed of an extremely hard, brittle metal. The shattered fragments can oftentimes cause serious injuries to the drilling crew as they attempt to remove or replace a reamer cutter. Thus, special protective equipment such as safety glasses or face shields are required to be worn by drill crews when changing the reamer cutters, and even then serious injuries can sometimes occur.

Yet another disadvantage of this type of prior art reamer/stabilizer is that the elongated dressing slots 38 have a tendency to "whip" the drilling mud as the drill string rotates, thus increasing the strain and torque required to turn the drill string assembly.

In view of the foregoing, it is readily apparent that what is needed in the art is a reamer/stabilizer which effectively overcomes the disadvantages of the prior art type reamer/stabilizers.

OBJECTS AND BRIEF SUMMARY OF THE INVENTION

It is a primary object of the present invention to provide a roller reamer/stabilizer which can be quickly and easily assembled or disassembled without having to subject the bearing blocks or bearing pin to hard hammer blows and potential damage, and without therefore subjecting the drilling crew to the hazard of shattered bearing pins or the like.

It is a further object of the present invention to provide a roller reamer/stabilizer which can be manufactured in a more compact, inexpensive manner, and which will operate with reduced torque exerted on the drill string.

Another object of the present invention is to provide a roller reamer/stabilizer in which the various parts are readily interchangeable, so as to provide extended wear, thus reducing the expense involved in using the reamer/stabilizer.

These and other objects and features of the present invention will become more fully apparent from the following description and appended claims, taken in conjunction with the accompanying drawings.

In accordance with the foregoing objects, the present invention consists of a roller reamer/stabilizer in which the reamer cutters can be quickly, easily and safely assembled or disassembled. The bearing blocks, reamer cutter and bearing pin can be entirely assembled outside of the pocket of the reamer/stabilizer and then, once assembled, the entire cutter assembly can simply be dropped into the pocket and it is then secured in the pocket by inserting a series of pull pins into bores which are formed transversely through the reamer body, the bearing blocks and pocket. The pins are retained in each bore by means of a snap ring. For dissassembly, the snap rings are removed and a special tool is threaded into the top of the pull pins so that they can be retracted from each of the transverse bores. The entire cutter assembly can then be dropped out of the pocket and the bearing blocks and the reamer cutter can then be taken off of the bearing pin.

The present invention also eliminates the need for an elongated dressing slot as in the prior art type reamer/stabilizer, and thus reduces the amount of torque on the drill string, as well as permitting the entire reamer/stabilizer to be constructed in a much more compact and thus less expensive configuration. All of the components are fully interchangeable, thus permitting the useful life of the reamer/stabilizer to be substantially extended.

BRIEF DESCRIPTION OF THE DRAWINGS

Reference is next made to the drawings, in which like parts are designated with like numerals throughout, and in which.

DETAILED DESCRIPTION OF THE PREFERRED EMBODIMENT

Figure 2:
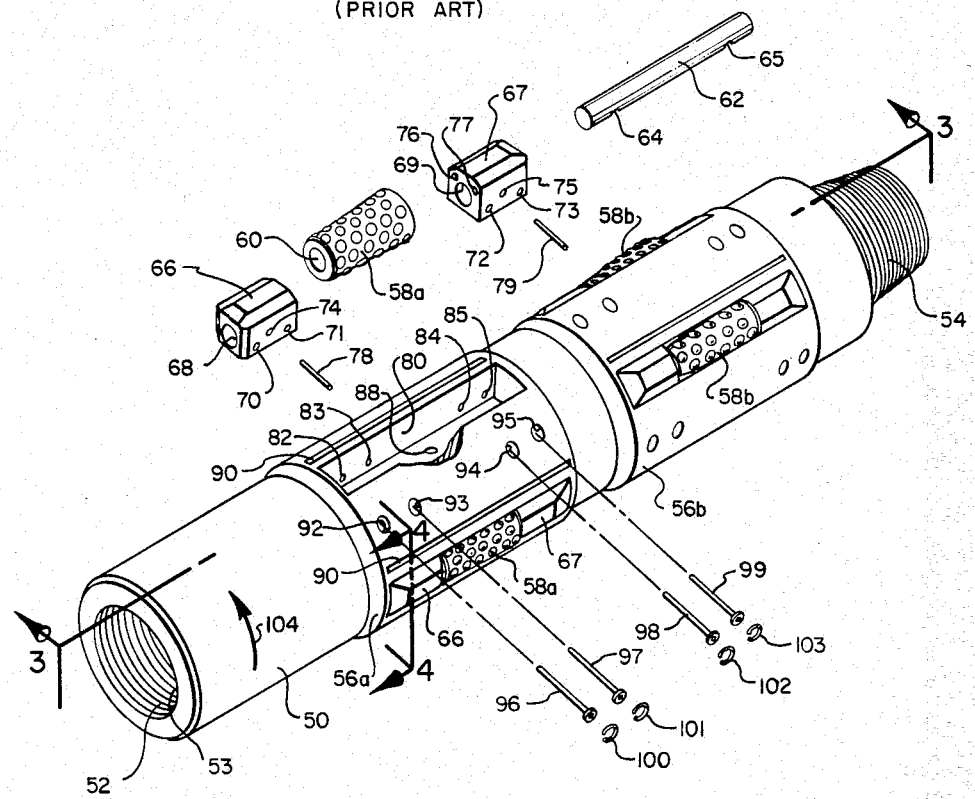
FIG. 2 is an exploded perspective view of a roller reamer/stabilizer constructed in accordance with the present invention.

With reference first to FIG. 2, the roller reamer/stabilizer of the present invention includes an elongated body 50 which is formed from a length of pipe and which has a threaded female fitting 52 and a threaded male fitting 54 at opposite ends thereof and to which the other sections of pipe in the drill string may be connected. A bore 53 runs through the center of the reamer body so that air or other cooling fluid may be forced through the bore 53 to clean and cool the drilling bit and the reamer cutters, as hereinafter more fully described.

The reamer body 50 has two sections 56a and 56b which are slightly diametrally enlarged. The diametrally enlarged sections 56a and 56b are positioned on the upper and lower portions of the reamer body 50, respectively. The lower diametrally enlarged section 56a has three reamer cutters, two of which are illustrated at 58a, which are equidistantly spaced about the periphery of the reamer/stabilizer. In a similar manner, the upper diametrally enlarged section 56b also has three reamer cutters, two of which are illustrated at 58b, spaced equidistantly around the periphery thereof. The reamer cutters 58a and 58b positioned on the lower and upper sections of the reamer body 50 are offset one from the other such that the reamer cutters 58b are aligned with the midpoint between the reamer cutters 56a.

Each of the reamer cutters 58 are identical in configuration and are mounted to the body of the reamer 50 in the same manner, which can best be understood from the exploded perspective portion of FIG. 2. As shown in FIG. 2, each reamer cutter 58 is typically tapered toward its leading end and has a bore 60 formed through its center. The cutter 58 may be any type of conventional cutter, as for example a Type K cutter, which is illustrated in FIG. 2, and which is designed with tungsten carbide knobs which act as teeth to fracture the extremely hard formations such as granite for which this type of cutter is designed. Other types of cutters which could be used include Type Q cutters for use in hard formations such as dolomite or hard lime, or Type V/HM cutters for use in softer formations such as shale.

The bore 60 of each cutter 58 is designed to receive a bearing pin 62. Bearing pin 62 has two small grooves 64-65 which are cut on the underside of bearing pin 62 at the leading and trailing ends thereof. As hereinafter more fully described, the grooves 64-65 are intended to receive in locking engagement pins 78-79 so as to prevent the bearing pin 62 from rotating.

Bearing blocks 66-67 are also each provided with a corresponding bore 68-69 formed through the center thereof for receiving the bearing pin 62. Bearing blocks 66 and 67 are positioned at the leading and trailing ends of the cutter 58 as hereinafter more fully described. Each bearing block 66 and 67 has a pair of holes 70-71 and 72-73, respectively, which are formed transversely through the bearing blocks 66-67. The holes 70-73 of bearing block 66-67 are positioned so that they will be in alignment with the holes 82-83 and 84-85, respectively, formed in the side of pocket 80.

Figure 1:
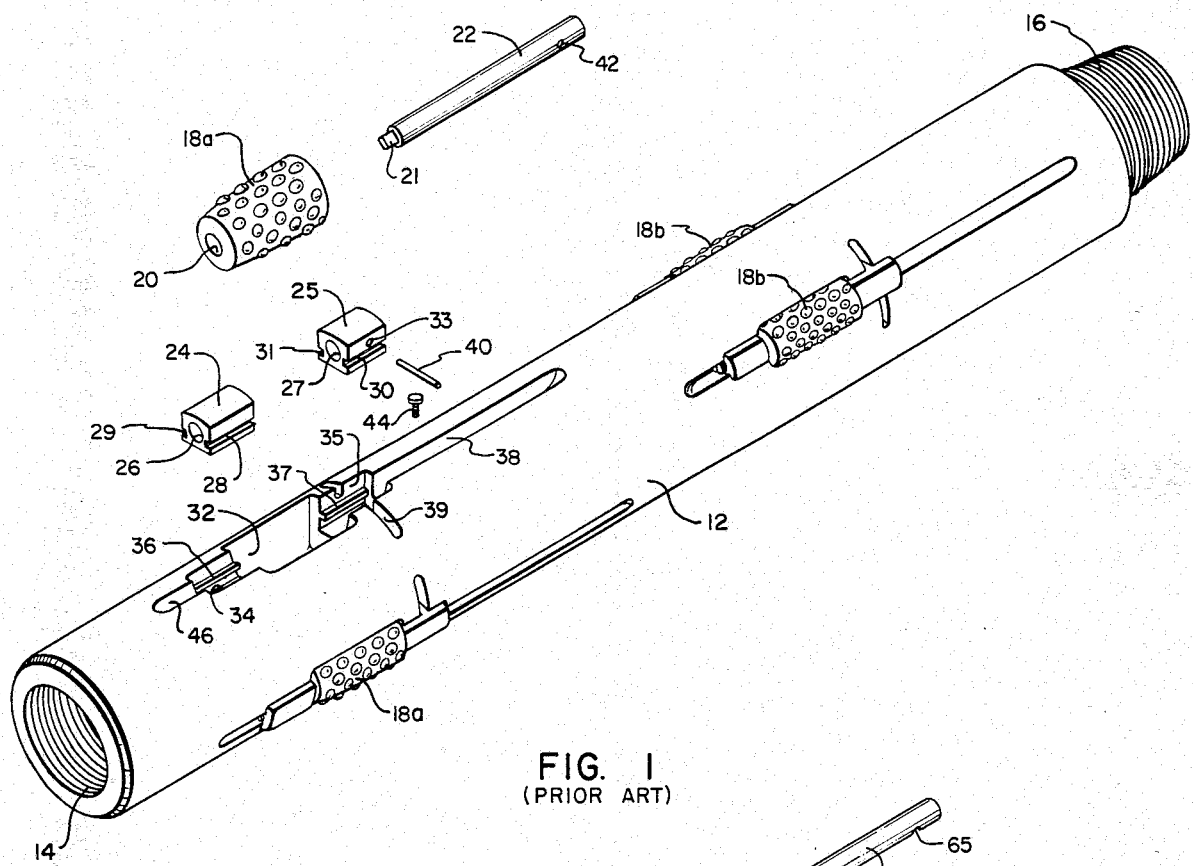
FIG. 1 is an exploded perspective view of a prior art reamer/stabilizer.

Pocket 80 is rectangular in configuration and is formed in the body 50 of the reamer/stabilizer. As shown best in FIG. 3, when assembled, the overall length of the bearing blocks 66-67 and cutter 58 which are placed onto the bearing pin 62 corresponds to the length of pocket 80. Thus, there is no need for a retaining pin 44 (see FIG. 1) as used in the prior art type reamer/stabilizers, and hence the problems attendant with loss or damage to the retaining pin 44 are eliminated in the reamer/stabilizer of this invention.

With reference again to FIG. 2, the lower and upper bearing blocks 66 and 67 also each have an additional hole 74 and 75, respectively, through which the pins 78 and 79 are inserted so as to engage the grooves 64 and 65 of bearing pin 62. The length of pins 78-79 correspond to the width of the bearing blocks 66-67 so that when the blocks 66-67 are in the pocket 80, the ends of pins 78-79 will be virtually flush with the walls of pocket 80 and thus positively retained.

In order to mount the cutter 58 to the body 50 of the reamer/stabilizer, the entire cutter assembly is first assembled outside of the pocket 80. This is done by first inserting the leading end of the bearing pin 62 into the bore 68 of the lower bearing block 66 until the end of pin 62 is flush with the end of the block. The bearing pin 62 is then rotated until the groove 64 is in proper alignment with hole 74 and then pin 78 is inserted through the hole 74 so as to engage groove 64. Next, the reamer cutter 58 is mounted onto the bearing pin 62 through bore 60. The upper bearing block 67 is then placed onto the trailing end of the bearing pin 62 and the upper bearing block is then rotated about the bearing pin 62 until hole 75 is in proper alignment with groove 65. Pin 79 is then inserted through the hole 75 so as to engage groove 65. This entire assembly is then dropped into the rectangular pocket 80. Pull pins 96-99 are then inserted through the transverse bores 92-95 in body 50, through the corresponding holes 70-73 of bearing blocks 66 and 67, until the ends of the pull pins 96-99 engage the corresponding holes 82-85 formed in the opposite wall of pocket 80. In this manner, each bearing block 66-67 is temporarily secured in the pocket 80 in a manner such that in contrast to the prior art type reamer/stabilizers of FIG. 1, and in contrast to the more permanently welded type prior art reamer/stabilizers, the entire cutter assembly of this invention, including the bearing blocks 66-67, cutter 58 and bearing pin 62, can be easily, quickly and safely removed from the reamer body 12 to accommodate repair or replacement.

Figure 4:
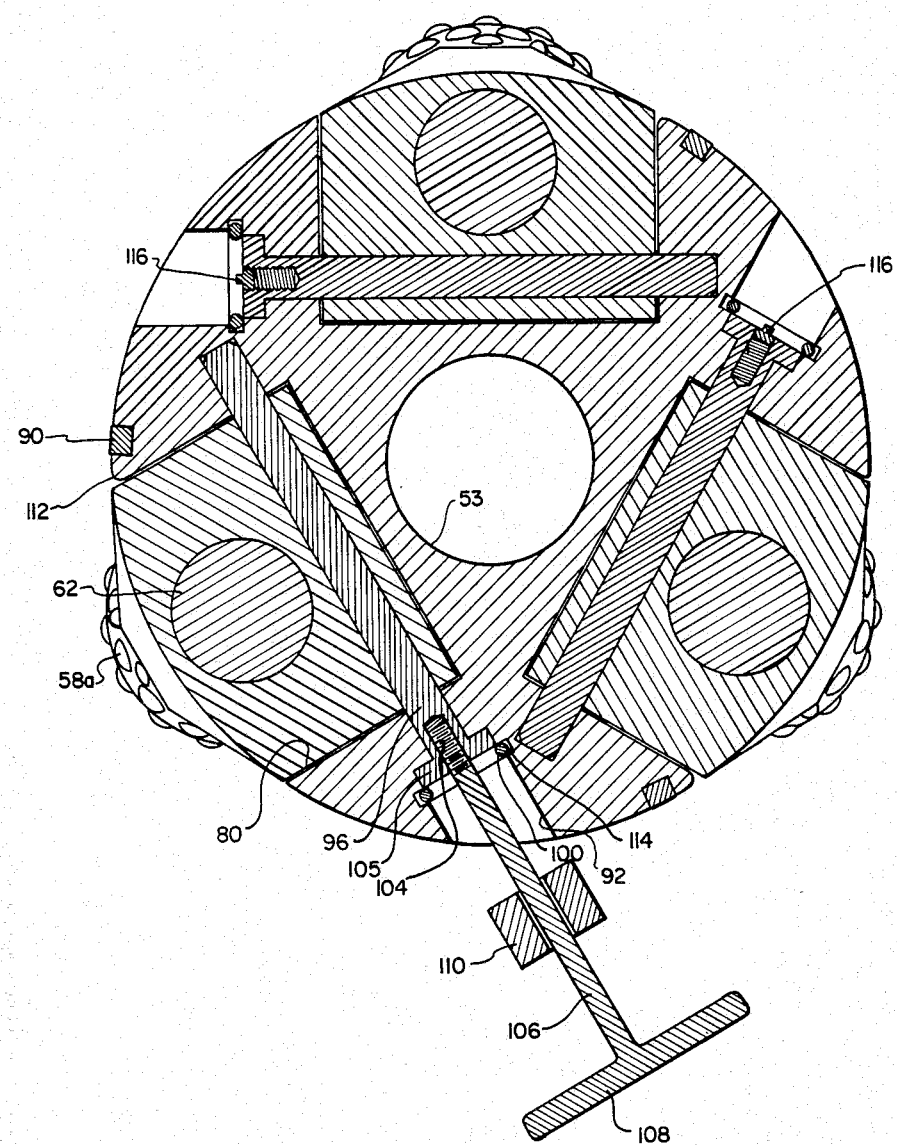
FIG. 4 is an enlarged lateral cross-sectional view of a fully assembled roller reamer/stabilizer taken at the position indicated by line 4—4 of FIG. 2.

As shown best in FIG. 4, each of the transverse bores, for example bore 92, has a slightly diametrally enlarged groove formed as at 114. The groove 114 is designed to receive a snap ring 100 which retains the pull pin 96 in its fully inserted position. As shown in FIG. 2, each of pull pins 96-99 has a corresponding snap ring 100-103 which is designed to be inserted into the corresponding transverse bore 92-95 for each pull pin.

As further illustrated in FIG. 4, each pull pin, as for example pull pin 96, is provided with a threaded female fitting 104 in the end thereof. A corresponding male plug, such as that illustrated at 116, may be inserted into the end of the pull pin in order to prevent it from becoming clogged with mud or debris. When the plug 116 is removed, a special tool 106 can be threaded into the female fitting 104 so as to engage the pull pin. The tool 106 has an enlarged head 108 and a cylindrical member 110 which is positioned on the neck of the tool 106. The cylindrical member 110 can be struck with a sledge hammer so that the pull pin 98 can be retracted once the snap ring 102 has been removed. Thus, in this manner, the danger of damaging or shattering the bearing pin 62 or bearing blocks 66-67 is eliminated and the drill crew is protected from the hazard of shattered pieces of metal as in the case of the prior art type reamer/stabilizers.

With further reference to FIGS. 2 and 4, it will be seen that an elongated strip 90 of hardened tungsten carbide metal is placed near the leading edge of pocket 80. Also, as illustrated at 112 in FIG. 4, the leading edge of each pocket 80 is rounded. The hardened strip 90 of tungsten carbide metal and the rounded edge 112 help to prevent the leading edge of the pocket 80 from wearing and "creeping" over onto the bearing blocks, which could subsequently hinder removal of the cutter assembly. Also, as shown in FIG. 2, small plugs 76-77 of tungsten carbide are placed in the face of each bearing block 66-67 to reduce wear from the rotating cutter 58.

Figure 3:
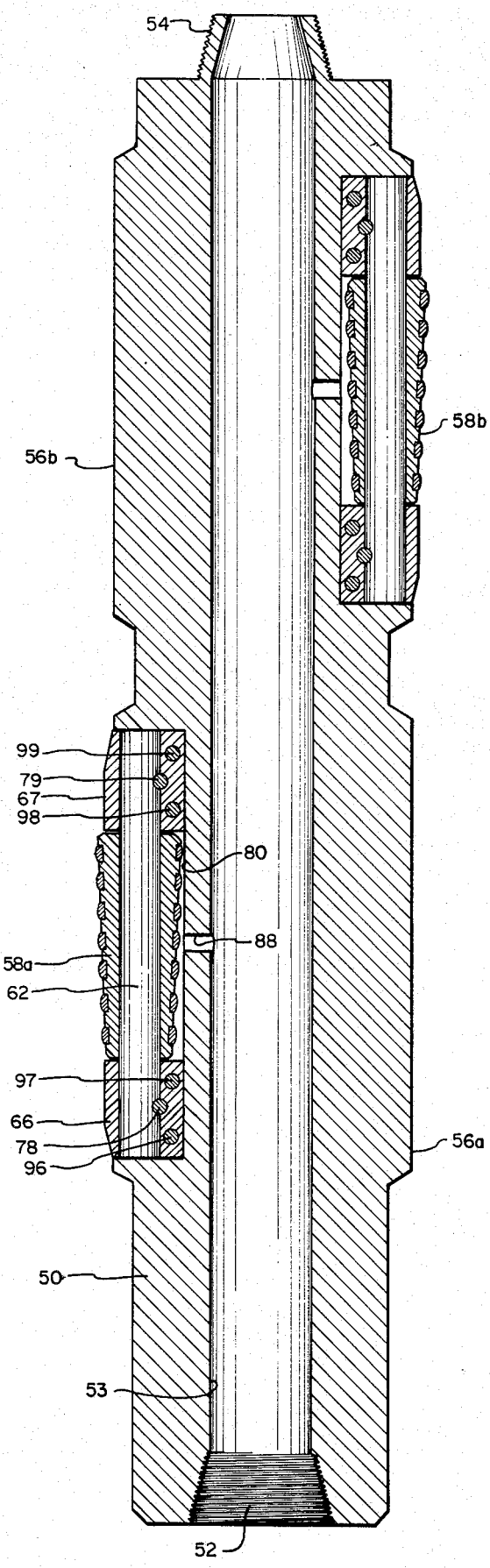
FIG. 3 is an enlarged longitudinal cross-sectional view of a fully assembled roller reamer/stabilizer taken at the position indicated by line 3—3 of FIG. 2.

As shown best in FIGS. 2 and 3, the small hole 88 which is formed at the bottom of pocket 80 communicates with the bore 53 which is formed through the center of the reamer/stabilizer. Thus, as air or other cooling fluid is forced through the interior bore 53, the cooling fluid will also enter through hole 88 into the pocket 80 so as to cool the reamer cutter 58 as it rotates about the bearing pin 62.

From the foregoing description, it will be readily apparent that the reamer/stabilizer of the present invention effectively eliminates the problems experienced with the prior art type reamer/stabilizers. For example, the entire cutter assembly can be conveniently assembled outside of the pocket 80. In so doing, there is no need to subject the bearing blocks or the bearing pin to hard sledge hammer blows, thus greatly enhancing the safety when changing worn cutters. Also, replacement can be much more easily affected, thus reducing down time. There is also no damage to the pocket or bearing blocks and hence, less problem in terms of a damaged bearing block being torn loose while the drill string is in operation.

While the present invention has been described with reference to the presently preferred embodiment as illustrated in FIGS. 2-4, the invention may be embodied in other specific forms without departing from its spirit or essential characteristics. The described embodiment is, therefore, to be considered in all respects only as illustrative and not restrictive, and the scope of the invention is thus indicated by the appended claims rather than by the foregoing description. All modifications or changes which come within the meaning and the range of the equivalency of the claims are to be embraced within their scope.

What is claimed and is desired to be secured by United States Letters Patent is:

1. A roller reamer/stabilizer apparatus for use on a drill string assembly, said apparatus comprising:

a reamer body having a plurality of pockets formed therein;

a plurality of cutter assemblies, each cutter assembly being adapted for placement into a corresponding pocket of said reamer body, and each cutter assembly comprising a pair of bearing blocks, a reamer cutter, a bearing pin, and means for mounting said bearing blocks and said reamer cutter onto said bearing pin prior to placement of the entire mounted cutter assembly into said corresponding pocket of said reamer body, said means for mounting said bearing blocks and said reamer cutter onto said bearing pin comprising a first pair of pins, said bearing blocks and said bearing pin having receiving means formed therein for receiving said first pair of pins, said first pair of pins being capable of engaging the receiving means of said bearing pin through the receiving means of said bearing blocks, the walls of said reamer body defining said pocket substantially preventing movement of said first pair of pins outside of said bearing blocks when said entire mounted cutter assembly is placed within said pocket; and means for removably securing each said bearing block in said corresponding pocket after said entire mounted cutter assembly is placed in said corresponding pocket of said reamer body, said means for removably securing each said bearing block in said corresponding pocket corresponding one or more second pins for insertion through said reamer body and said bearing blocks so as to lock each said bearing block in said pocket of the reamer body.

2. The apparatus of claim 1 wherein the receiving means of each said bearing block comprises a hole which extends through the width of each said block and wherein the receiving means of said bearing pin comprises a groove at each end of said bearing pin, said grooves being placed to correspond with said holes formed through the width of said bearing blocks, and wherein each said first pin is adapted to be inserted into a corresponding hole of one of said bearing blocks so as to engage one of said grooves formed on said bearing pin.

3. The apparatus of claim 1 wherein the overall length of said entire mounted cutter assembly is essentially the same as the overall length of said corresponding pocket into which the entire mounted cutter assembly is placed.

4. The apparatus of claim 1 wherein each said bearing block comprises a pair of holes formed through the width of each said bearing block and wherein said reamer body comprises corresponding holes which are adapted to be aligned with the holes formed in each bearing block when said entire mounted cutter assembly is placed in its corresponding pocket, and wherein said means for removably securing each said bearing block comprises a pair of second pins for each said bearing block, said second pins being adapted to be inserted through said holes formed in said reamer body and through said corresponding aligned holes in said bearing blocks.

5. The apparatus of claim 4 further comprising a plurality of snap rings adapted for insertion into each said hole formed in said reamer body such that each said second pin inserted into each said hole formed in the reamer body will be secured by a corresponding snap ring.

6. The apparatus of claim 4 wherein each said second pin comprises a threaded female fitting formed in one end thereof and wherein said apparatus further comprises means for engaging said threaded female fitting so as to be able to retract said second pins from the corresponding holes formed in the reamer body when it is desired to remove said second pins so as to unlock said bearing blocks from their corresponding pocket in the reamer body.

7. The apparatus of claim 1 wherein each said bearing block comprises one or more hardened plugs placed in the face of said bearing block adjacent to said reamer cutter.

8. The apparatus of claim 1 wherein said reamer body further comprises a strip of hardened metal placed adjacent to at least one longitudinal edge of each said pocket.

9. The apparatus of claim 1 wherein the leading, longitudinal edge of each said pocket is rounded to prevent said leading edge from creeping over onto the said bearing blocks due to wear.

10. A roller/reamer stabilizer apparatus for use on a drill string assembly, said apparatus comprising:

(a) a reamer body having a plurality of pockets formed therein;

(b) a plurality of cutter assemblies, each cutter assembly being adapted for placement into a corresponding pocket of said reamer body, and each cutter assembly comprising:

(i) a bearing pin having a groove formed on a side thereof at first and second opposite ends of said bearing pin;

(ii) a reamer cutter rotatably mounted on said bearing pin;

(iii) a first bearing block into which a first end of said bearing pin is inserted, said first block having a hole therethrough formed in axial alignment with said groove of said first end of said bearing pin;

(iv) a second bearing block into which a second end of said bearing pin is inserted, said second block having a hole therethrough formed in axial alignment with said groove at said second end of the bearing pin;

(v) a pair of pins for engaging said grooves through said holes formed in each bearing block at said first and second ends of said bearing pin, whereby said bearing pin is locked in position in said bearing blocks prior to placement of the entire mounted cutter assembly into said corresponding pocket of said reamer body, the walls of said reamer body defining said pocket substantially preventing movement of said groove-engaging pins outside of said bearing blocks when said entire mounted cutter assembly is placed within said pocket; and (c) means for removably securing said entire mounted cutter assembly in said corresponding pocket of the reamer body after said entire mounted cutter assembly is placed in said corresponding pocket of said reamer body, said means comprising (i) a plurality of pull pins inserted through said reamer body and said bearing blocks so as to lock each said bearing block in said pocket of the reamer body.

11. The apparatus of claim 10 wherein said plurality of pull pins compises at least a first pin and a second pin, said first pin passing transversely through said reamer body and said first bearing block and said second pin passing transversely through said reamer body and said second bearing block.

12. The apparatus of claim 10 wherein said means (c) further comprises (ii) a snap ring for securing each of said pull pins in place.

13. The apparatus of claim 12 wherein said means (c) further comprises (iii) means for retracting said pull pins from the reamer body.

14. A roller reamer/stabilizer apparatus for use on a drill string assembly, said apparatus comprising:
   a reamer body having a plurality of pockets formed therein;
   a plurality of cutter assemblies, each cutter assembly being adapted for placement into a corresponding pocket of said reamer body, and each cutter assembly comprising:
      an upper bearing block and a lower bearing block;
      a reamer cutter positioned between said bearing blocks;
      a bearing pin on which said bearing blocks and said reamer cutter are mounted, said bearing pin having a groove formed on at least one end thereof on a side of said bearing pin; and
      means for anchoring said bearng pin within said bearing blocks to prevent rotation of said bearing pin, said anchoring means comprising an anchoring pin passing transversely through one of said bearing blocks to engage said groove of the bearing pin prior to placement of the entire mounted cutter assembly into said corresponding pocket of said reamer body, the walls of said reamer body defining said pocket substantially preventing movement of said anchoring pin outside of said bearing blocks when said
   entire mounted cutter assembly is placed within said pocket; and
   means for removably securing said entire mounted cutter assemblies within said corresponding pockets after said entire mounted cutter assemblies are placed in said corresponding pockets, said securing means comprising at least a first and a second pull pin, said first pull pin passing transversely through said reamer body and said upper bearing block to secure said upper bearing block within said corresponding pocket, and said second pull pin passing transversely through said reamer body and said lower bearing block said lower bearing block within said corresponding pocket, said entire mounted cutter assemblies being capable of removal from said reamer body upon removal of said first and second pull pins.

15. The apparatus of claim 14 wherein said means for anchoring said bearing pin within said bearing blocks comprises two pins, a first pin passing through said upper bearing block and a second pin passing through said lower bearing block, and wherein grooves are formed at both ends of said bearing pin, each said pin engaging a corresponding groove formed on said bearing pin.

16. The apparatus of claim 14 wherein said securing means further comprises a first snap ring for anchoring said first pull pin within said reamer body and a second snap ring for anchoring said second pull pin within said reamer body.

17. The apparatus of claim 14 further comprising means for retracting said first and second pull pins from said reamer body.

18. A method of assembling a roller reamer/stabilizer apparatus wherein said apparatus includes a reamer body having a plurality of pockets formed therein, and a plurality of cutter assemblies, each cutter assembly being adapted for placement into a corresponding pocket of said reamer body, and each cutter assembly comprising a pair of bearing blocks, a reamer cutter, a bearing pin, and means for mounting said bearing blocks and said reamer cutter onto said bearing pin prior to placement of the entire mounted cutter assembly into said corresponding pocket of said reamer body, said means for mounting said bearing blocks and said reamer cutter onto said bearing pin comprising a first pair of pins, said bearing blocks and said bearing pin having receiving means formed therein for receiving said first pair of pins, said first pair of pins being capable of engaging the receiving means of said bearing pin through the receiving means of said bearing blocks, said method comprising the steps of:
   (a) assembling each said cutter assembly by mounting said bearing blocks and said reamer cutter onto said bearing pin such that said reamer cutter is positioned between said bearing blocks;
   (b) inserting said first pair of pins through said receiving means of said bearing blocks and into said receiving means of said bearing pin, thereby locking the position of said bearing pin in said bearing blocks;
   (c) placing each entire mounted cutter assembly assembled in steps (a) and (b) into a corresponding pocket of said reamer body such that the walls of said reamer body defining said corresponding pocket substantially prevent movement of said first pair of pins outside of said bearing blocks when said entire mounted cutter assembly is placed within said pocket; and
   (d) removably securing each said bearing block in said corresponding pocket by inserting one or more pull pins through transverse holes formed in said reamer body and into corresponding holes formed in said bearing blocks.

19. The method of claim 18 further comprising the step of securing each said pull pin within its corresponding transverse hole formed through said reamer body by inserting a snap ring into said transverse holes following insertion of said pull pins.

* * * * *